(12) United States Patent
Govindarajulu et al.

(10) Patent No.: US 9,885,256 B2
(45) Date of Patent: Feb. 6, 2018

(54) METHOD FOR OPTIMIZATION OF CONTROL AND FAULT ANALYSIS IN A THERMAL POWER PLANT

(71) Applicant: ABB Technology Ltd, Zurich (CH)

(72) Inventors: Sudhakar Govindarajulu, Coimbatore (IN); Sankara Subramanian, Bangalore (IN); Battena Srinivasa, Bangalore (IN); Sumeet Nesargi, Bangalore (IN)

(73) Assignee: ABB Schweiz AG, Baden (CH)

( * ) Notice: Subject to any disclaimer, the term of this patent is extended or adjusted under 35 U.S.C. 154(b) by 427 days.

(21) Appl. No.: 14/584,300

(22) Filed: Dec. 29, 2014

(65) Prior Publication Data

US 2015/0120071 A1 Apr. 30, 2015

Related U.S. Application Data

(63) Continuation of application No. PCT/IB2013/001181, filed on Jun. 7, 2013.

(30) Foreign Application Priority Data

Jun. 29, 2012 (IN) .......................... 2597/CHE/2012

(51) Int. Cl.
*G05D 3/12* (2006.01)
*G05D 11/00* (2006.01)
(Continued)

(52) U.S. Cl.
CPC ............ *F01K 13/02* (2013.01); *G05B 13/024* (2013.01); *G05B 15/02* (2013.01)

(58) Field of Classification Search
CPC ........ F01K 13/02; G05B 13/02; G05B 13/024
(Continued)

(56) References Cited

U.S. PATENT DOCUMENTS 3,782,153 A * 1/1974 Winchester ............. B21B 37/16
72/9.4
3,934,419 A * 1/1976 Aanstad ................... F01D 17/24
60/660

(Continued)

OTHER PUBLICATIONS

International Search Report (PCT/ISA/210) dated Aug. 23, 2013, by the European Patent Office as the International Searching Authority for International Application No. PCT/IB2013/001181.

(Continued)

*Primary Examiner* — Mark Connolly
(74) *Attorney, Agent, or Firm* — Barnes & Thornburg LLP

(57) ABSTRACT

An exemplary control system performs a control and fault analysis method in a thermal power plant using plant data specifications during normal operation of the plant. The method includes obtaining information for at least one set point from the plant data specification which includes a list of process parameters and process outputs. One or more control loops are controlled by providing set points for control based on the information obtained for the at least one set point to operate the thermal power plant and identifying gaps in controlling the one or more control loops in the thermal power plant specification and at least one set point is iteratively manipulated to meet the demand. Further, the plant data specification is updated based on the manipulated at least one set point used to meet the demand, and the updated plant data specification is used for controlling the plant to meet the demand.

9 Claims, 5 Drawing Sheets

(51) Int. Cl.
*G05D 17/00* (2006.01)
*F01K 13/02* (2006.01)
*G05B 13/02* (2006.01)
*G05B 15/02* (2006.01)

(58) Field of Classification Search
USPC .......................................................... 700/287
See application file for complete search history.

(56) References Cited

U.S. PATENT DOCUMENTS

| | | | |
|---|---|---|---|
| 4,027,145 A | 5/1977 | McDonald et al. | |
| 7,038,172 B1* | 5/2006 | Stuck | A47J 37/044 |
| | | | 219/388 |
| 8,406,356 B2* | 3/2013 | Hollis | H04L 25/03885 |
| | | | 375/231 |
| 2002/0093201 A1 | 7/2002 | Soucy | |
| 2002/0165637 A1* | 11/2002 | Dillon | G05B 19/4097 |
| | | | 700/162 |
| 2009/0143871 A1* | 6/2009 | Gao | G05B 13/04 |
| | | | 700/29 |
| 2011/0066298 A1* | 3/2011 | Francino | F01K 9/003 |
| | | | 700/290 |

OTHER PUBLICATIONS

Metso Automation: D-E-B Coordinated Control for Supercritical Once-Through Steam Generators, Jan. 1, 2009, pp. 1-8.

* cited by examiner

METHOD FOR OPTIMIZATION OF CONTROL AND FAULT ANALYSIS IN A THERMAL POWER PLANT

RELATED APPLICATION(S)

This application claims priority under 35 U.S.C. § 120 to International application no. PCT/IB2013001181 filed on Jun. 7, 2013, designating the U.S., and claiming priority to Indian application 2597/CHE/2012 filed in India on Jun. 29, 2012. The content of each prior application is hereby incorporated by reference its entirety.

FIELD

The present disclosure relates to control and fault analysis in a thermal power plant and more particularly to use of a plant data specifications for efficient control and fault analysis of the plant during its normal operation.

BACKGROUND INFORMATION

Electric power is generated by converting one form of energy into electrical energy. In a thermal power plant, thermal energy is converted into electrical energy. Known thermal power plants include a boiler unit, fed by water for steam and fuel-oxygen for heat energy, including one or more furnaces and water circulation systems. The steam produced by the boiler is passed through one or more super-heaters and then to the turbine through the throttle valves. After passing through the high pressure turbine, the steam loses thermal and pressure energy which is further regained by passing it through super heaters. The steam is then passed through intermediate and low pressure turbines to ensure full utilization. Finally, the steam is condensed reheated and circulated back to the boiler through feed water pump. Electrical generators, synchronized to an electric grid, can be shafted to the turbines and thus electrical power is generated.

The plant is controlled by distributed control system (DCS) and is operated in various modes. The modes of thermal power plant control can be Manual mode, Boiler follow mode, Turbine follow mode, and coordinated mode. While coordinated mode and Turbine follow mode can be the ones used during normal plant operation. Exemplary embodiments of the present disclosure relate to the plant control optimization and fault detection during these modes.

Turbine suppliers furnish data sheets based on designs having different power generation specifications (expressed in Mega Watt, MW) and these data sheet specifications serve as input parameters for plant startup operation. The specifications of the datasheets are not generally used on a continuous basis by the DCS to provide set-points for the key process values e.g., throttle pressure, throttle temperature, reheat temperature and drum level. Such datasheet specifications serve as a baseline to gauge the performance of the plant. Thus, there is a potential for datasheet specifications being integrated with the DCS for better control of the plant and to track performance.

Further, in the scenario where the difference in MW generation and the demand is significant, the time taken to reach the demand can be considerably high. Control procedures should provide for optimization with regard to the time taken by the plant to adjust itself to meet the demand.

Scenarios of control procedures during a demand change and its effect, specifically on a degraded plant (e.g., a degraded furnace) can be illustrated to indicate improvement/optimization of the parameters in control and fault analysis.

Example 1

Increase in Demand from 350 to 700 MW

The throttle pressure and temperature set-points can be increased and the super heater and re-heater valves can be actuated to increase the pressure and temperature. This leads to sudden decrease in the steam pressure in the boiler and subsequent shrinking effect. The degraded furnace starts gradually by increasing the fuel and feed-water input to meet the demand. The coordinated mode takes care of delaying the turbine action based on the boiler response. Thus, the ramp-up time could be considerably high and the degradation of furnace is unnoticed which means less plant efficiency.

Example 2

Decrease in Demand from 750 to 350 MW

The throttle pressure and temperature set-points can be decreased and the super heater and re-heater valves can be actuated to decrease the pressure and temperature. This leads to a sudden increase in the steam pressure in the boiler and subsequent swelling effect. The degraded furnace starts acting gradually by decreasing the fuel and feed-water input to meet the demand. The coordinated mode takes care of delaying the turbine action based on the boiler response. Thus, the ramp-down time could be considerably high and the degradation of furnace is unnoticed which means less plant efficiency and further degradation.

Plant equipment datasheet specifications should be integrated and used with the control system to effectively control during normal operation and in addition have a plant where any degradation or fault can be identified for suitable correction in the control procedure to be affected.

SUMMARY

An exemplary method for controlling of a thermal power plant to provide electrical power per demand is disclosed, comprising: obtaining information for at least one set point from a plant data specification that includes a list of process parameters and process outputs; controlling one or more control loops in the thermal power plant by providing set points for control based on the obtained information for the at least one set point to operate the thermal power plant; identifying gaps in controlling the one or more control loops in the thermal power plant specification and iteratively manipulating at least one set point to meet the demand; updating the plant data specification based on the manipulated at least one set point used to meet the demand; providing conditionally, feed forward signals to the one or more actuators as an additional bias, wherein the additional bias is estimated based on the updated plant data specification and a difference between the demand and actual generation values; and using the updated plant data specification and the feed forward signals for control of the thermal power of the plant to meet the demand.

An exemplary control system for a thermal power plant to provide electrical power to meet a demand is disclosed, the control system comprising: a database of a plant data specification providing a list of process parameters and process outputs to obtain information of at least one set point for controlling one or more control loops; a set point correction module to track adjustments in the at least one set point based on the information of the at least one set point to reduce the gap to meet the demand and to update the plant data specification in the database; a feed forward signal calculator module to compute feed forward signals based on the updated plant data specification including actuator signals, demand value, and actual generation value; and a switch module to conditionally provide the feed forward signals to the one or more actuators as an additional bias based on differences in the demand value and the actual generation value, thereby controlling the thermal power plant to meet the demand.

DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
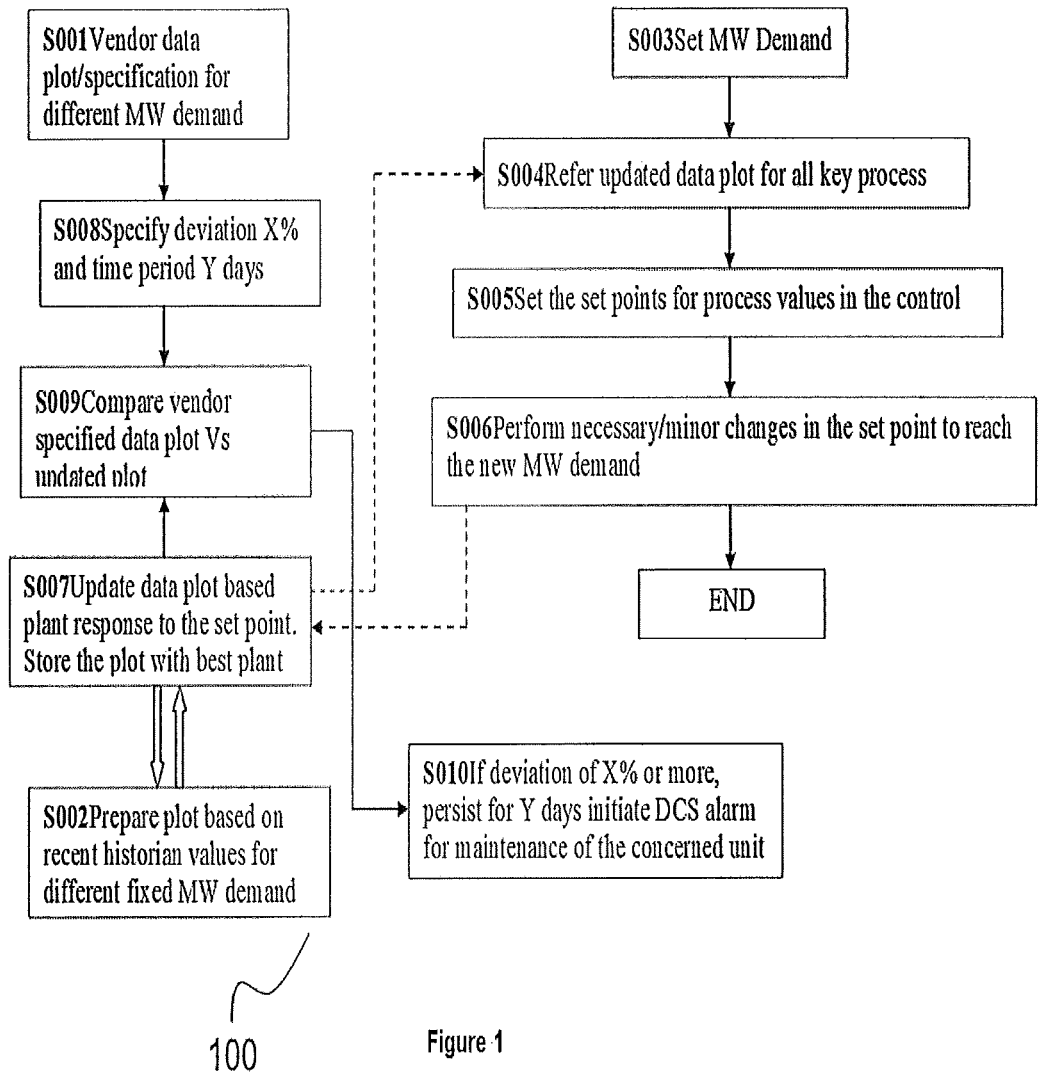
FIG. 1 is a method of controlling a thermal power plant in accordance with an exemplary embodiment of the present disclosure.

According to an exemplary embodiment of the present disclosure, a method based on use of a plant data specification and periodically updating the plant data specification to efficiently control the plant is disclosed. The plant data specification includes a list of process parameters (e.g., input and output values, set point information, and process outputs) for process units including the signal information for actuators. The updates can be used to detect and analyze faults in process units. The method includes a) obtaining the information for at least one set point from the provided plant data specification containing list of process parameters and process outputs; b) controlling one or more control loops by providing set points for control based on the obtained one or more set point information from the plant data specification to operate the thermal power plant; c) identifying gaps in controlling the one or more control loops in the thermal power plant specification and iteratively manipulating at least one set point to meet the demand; d) updating the plant data specification based on the manipulated at least one set point used to meet the demand; and e) using the updated plant data specification for control of the plant to meet the demand.

As an embodiment of the disclosure, a method to integrate feed forward technique to control the power plant is provided. The method includes an additional step of providing an additional bias to one or more actuator signals by feed forward control, wherein the additional bias is estimated based on the plant data specification.

Another exemplary embodiment of the disclosure is directed to a control system that makes use of a plant data specification for control of the power plant. The control system includes a database for storing a plant data specification with periodic updates (original vendor data and periodic updates on set point values to meet the demand). The control system also includes a set point correction module to track gaps in set points for control of the various control loops to meet demand and update the plant data specification; and a decision module to compare the gaps in controlling the various control loops with a predefined threshold to identify fault conditions in the process units associated with the various control loops including determining a maintenance condition.

In yet another exemplary embodiment of the disclosure, the control system with an integrated feed forward technique using a plant data specification is provided. The control system additionally contains a feed forward signal calculator module to compute feed forward signals based on the plant data specification including actuator signals, demand and generation values. It also can have a switch module to provide feed forward signals to respective actuators as an additional bias based on the significance of differences in the demand and actual generation values, e.g., provide the additional bias only if the differences can be large.

Exemplary embodiments of the present disclosure illustrate a method and system to integrate and use plant datasheet specifications for control of a thermal power plant.

FIG. 1 is a method of controlling a thermal power plant in accordance with an exemplary embodiment of the present disclosure. FIG. 1 shows various steps for using a datasheet to detect the presence of any fault (e.g., substantial degradation) in the plant units.

In the context of the present disclosure, the datasheet specification is also a plant data specification, which can include data that is generated from the plant for the plant control.

Step S001: Obtain Plant Unit Data Specifications

In Step S001, plant unit manufacturers provide datasheets for their units. Turbine manufacturers furnish datasheets with recommendations of the process parameters specified for different MW Generation.

Figure 2:
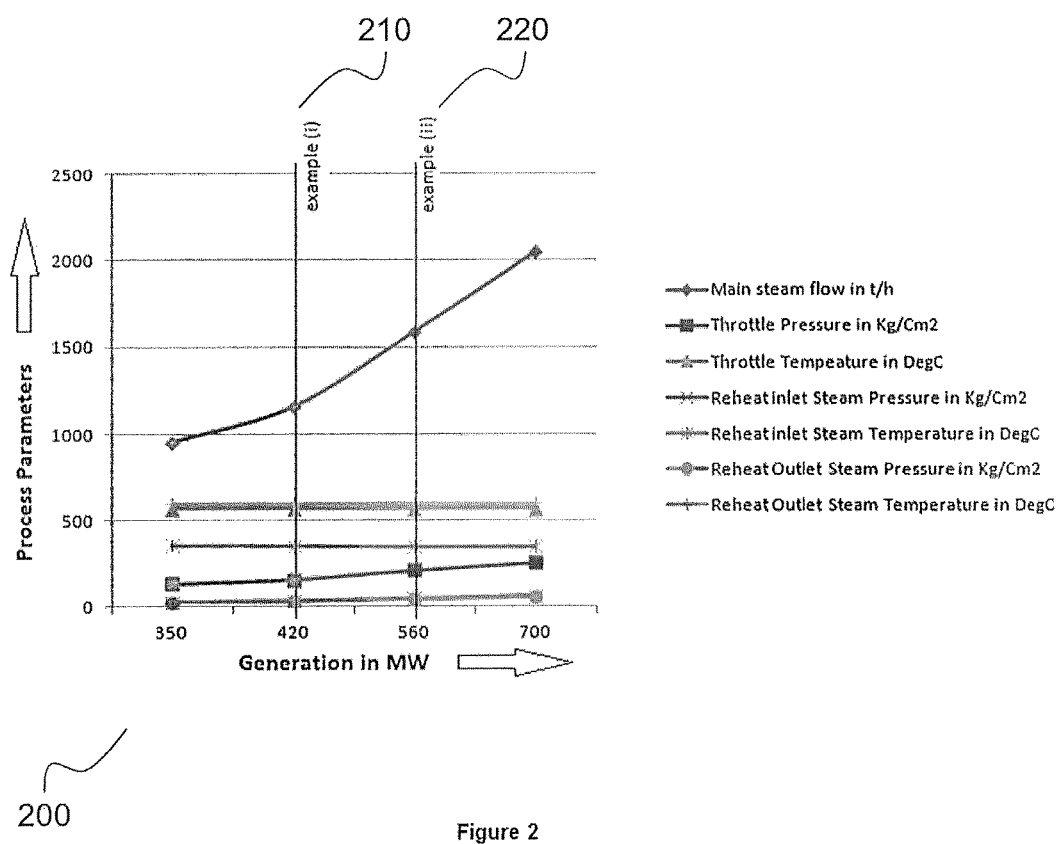
FIG. 2 is an example of a plant data specification used for controlling a thermal power plant in accordance with an exemplary embodiment of the present disclosure.

The datasheet could be used to read parameters related with the unit operation. FIG. 2 is an example of a plant data specification used for controlling a thermal power plant in accordance with an exemplary embodiment of the present disclosure. As shown in FIG. 2, with reference to datasheet plots example (i) relates to a 700 MW power plant where the process parameters for 420 MW generation (210) are as follows:

Main steam flow=1159 t/h;
Throttle Pressure/Temperature=158 Kg/cm$^2$ at 568° C.;
Reheat inlet steam pressure/Temperature=25.1 Kg/Cm$^2$ at 353° C.; and
Reheat inlet steam pressure/Temperature=33.68 Kg/Cm$^2$ at 596° C.

Example (ii) relates to a 700 MW power plant where the process parameters for 560 MW generation (220) are as follows:

Main steam flow=1590 t/h;
Throttle Pressure/Temperature=211 Kg/cm$^2$ at 568° C.;
Reheat inlet steam pressure/Temperature=47.4 Kg/Cm$^2$ at 348° C.; and
Reheat inlet steam pressure/Temperature=47.4 Kg/Cm$^2$ at 596° C.

This data is used as guidelines during manual plant start up. Once the plant is stabilized, the control loops can be put in Auto mode. According to an exemplary embodiment of the present disclosure, the datasheet specification can be used during the stabilized mode of the plant.

Step S002: Prepare Plot Based on Historian Value

In Step S002, the historian data of the process parameters and plots of relevant curves for different MW Generation can be recorded. The recordation can include storing the data in a database in DCS module as plant data specification. The plant efficiency is determined in-terms of input/output and the best curves with good plant efficiency can be stored as an update of the plant data specification. This activity happens on a periodic basis with recent data, ensuring that the curves reflect real plant condition.

Step S003: Obtain Demand Information

In Step S003, the MW demand on the power plant is set from the grid (Load distribution center) based on timings and different consumer demands. The demand information is used along with the plant data specification in the method.

Steps S004-S006: Operate Plant to Meet the Demand Using Data Specification

Figure 3:
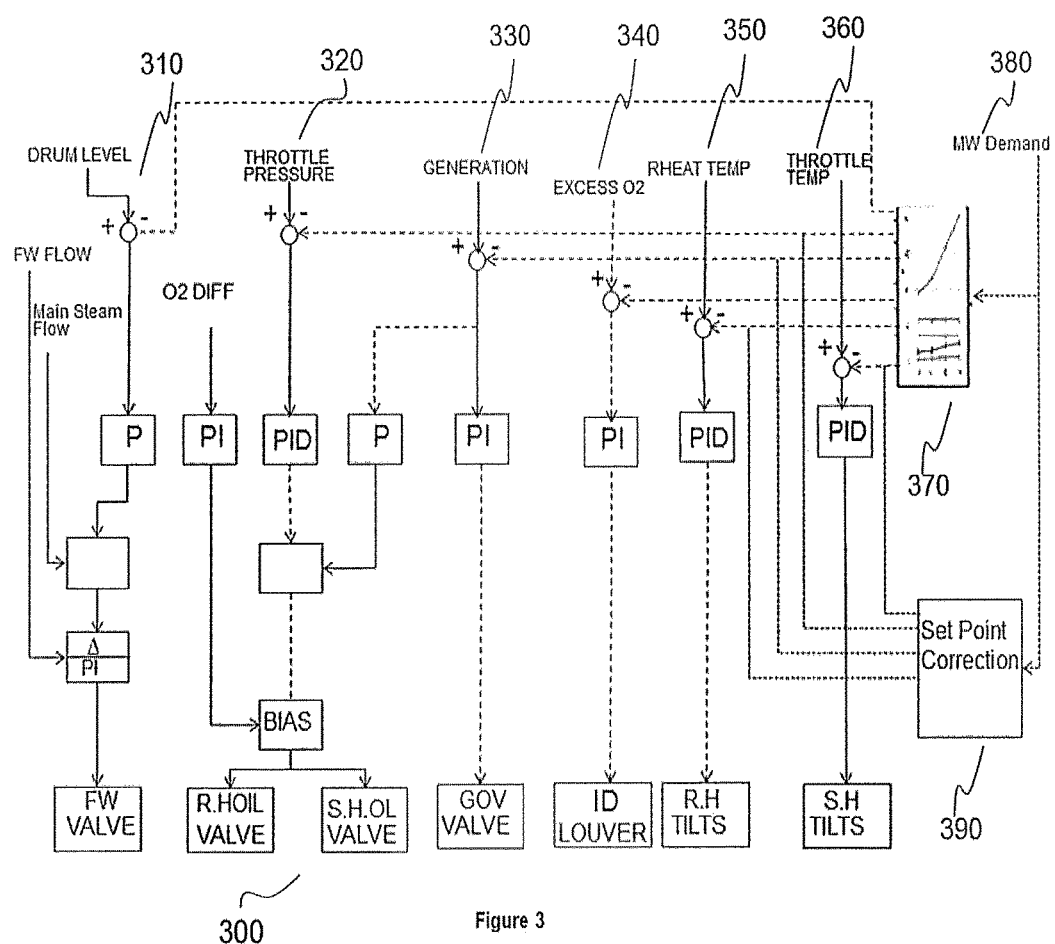
FIG. 3 is an illustration of control system with multiple control loops and plant data specification for controlling a thermal power plant in accordance with an exemplary embodiment of the present disclosure.

In Steps S004 through S006, when a new MW demand is set, the set point information from the plant data specification for different processes can be obtained. The set point information is used to provide a set point that triggers the control loop into action until the process parameter reaches the set point with acceptable deviations. FIG. 3 is an illustration of control system with multiple control loops and plant data specification for controlling a thermal power plant in accordance with an exemplary embodiment of the present disclosure. As shown in FIG. 3, for example, the drum level control loop 310 with a three element controller is used for operation of the plant through the control system 300. The control loop receives the drum level set-point from the stored data plots and plant data specification in a database (370), and computes the feed water flow based on Main steam flow/drum level and the current feed water flow. In the same manner, various control loops (320, 330, 340, 350 and 360) are used to meet a MW demand (380).

After a predetermined timeframe the power generations can reach the demand with or without deviations. This deviation (gap) is noted and used for analyzing a fault. The set-points for key process values can be increased/decreased iteratively. The steps for increase or decrease can change from plant to plant and decided by process consultants.

The correction/deviation quantities serve as inputs to correct the plots generated (thereby reflection the actual plant state) and can be recorded through a set point correction module 390 for updating the plant data specification.

Step S007-S010: Detection of Degradation

Figure 4:
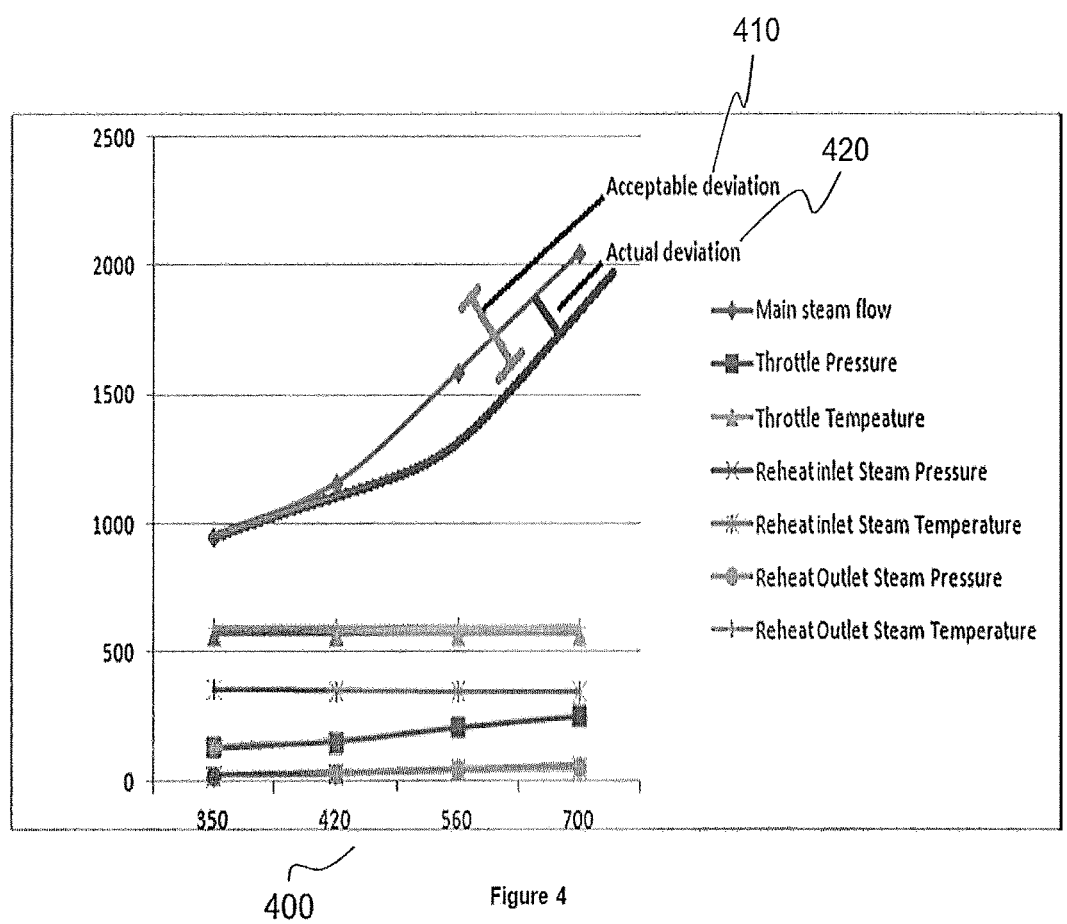
FIG. 4 is an illustration for updating the plant data specification in accordance with an exemplary embodiment of the present disclosure.

The power plant can generate power that almost follows the standard data sheet when the plant is new or successful maintenance is done. However due to various factors, the plant equipment can degrade over time resulting in less MW generation. While this plant state gets updated in the plant data specification, it is easy to identify which part of plant is degraded. This could either call for immediate maintenance if feasible or serve as inputs for maintenance during shutdown. FIG. 4 is an illustration for updating the plant data specification in accordance with an exemplary embodiment of the present disclosure. Namely, FIG. 4 illustrates graphically an instance of an acceptable deviation (410) along with an actual deviation (420) in a process parameter plotted against MW demand. The actual deviations and the time-period of such sustained deviations needs to be specified by process experts.

In Steps S007 through Steps S010, the basic control loops for the key parameters remain unaltered. During engineering, the datasheet information can be provided and the control loops can be tuned during start-up and stabilization of the plant.

It should be understood that once an MW demand is set from the grid, the corresponding process value set points can be obtained from the updated plant data specification and the power plant can be controlled to reach the MW demand within as minimal a time as possible.

Thus, the method illustrated through FIG. 1, is based on use of plant data specification and periodically updating the plant data specification to efficiently control the plant. The updates can be used to detect and analyze faults. To summarize the method, the method includes a) obtaining at least one set point information from the provided plant data specification containing list of process parameters and process outputs; b) controlling one or more control loops by providing set points for control based on the obtained one or more set point information from the plant data specification to operate the thermal power plant; c) identifying gaps in controlling the said one or more control loops in the thermal power plant specification and iteratively manipulating at least one set point to meet the demand; d) updating the plant data specification based on the manipulated at least one set point used to meet the demand; and e) using the updated plant data specification for control of the plant to meet the demand.

Another aspect related to efficient control of plant is lead compensation. The following response of the plant can be considered to illustrate dynamic lead compensation in the control loops:

(i) Fast ramp-up/ ramp-down when a new MW is set
(ii) Stable operation without transient overshoot.

There can also be scenarios, while the final MW demand (at a particular time in future) is not known and the input from the grid is in small increment/decrement steps. An adaptive feed forward technique is blended with the control method explained above.

Figure 5:
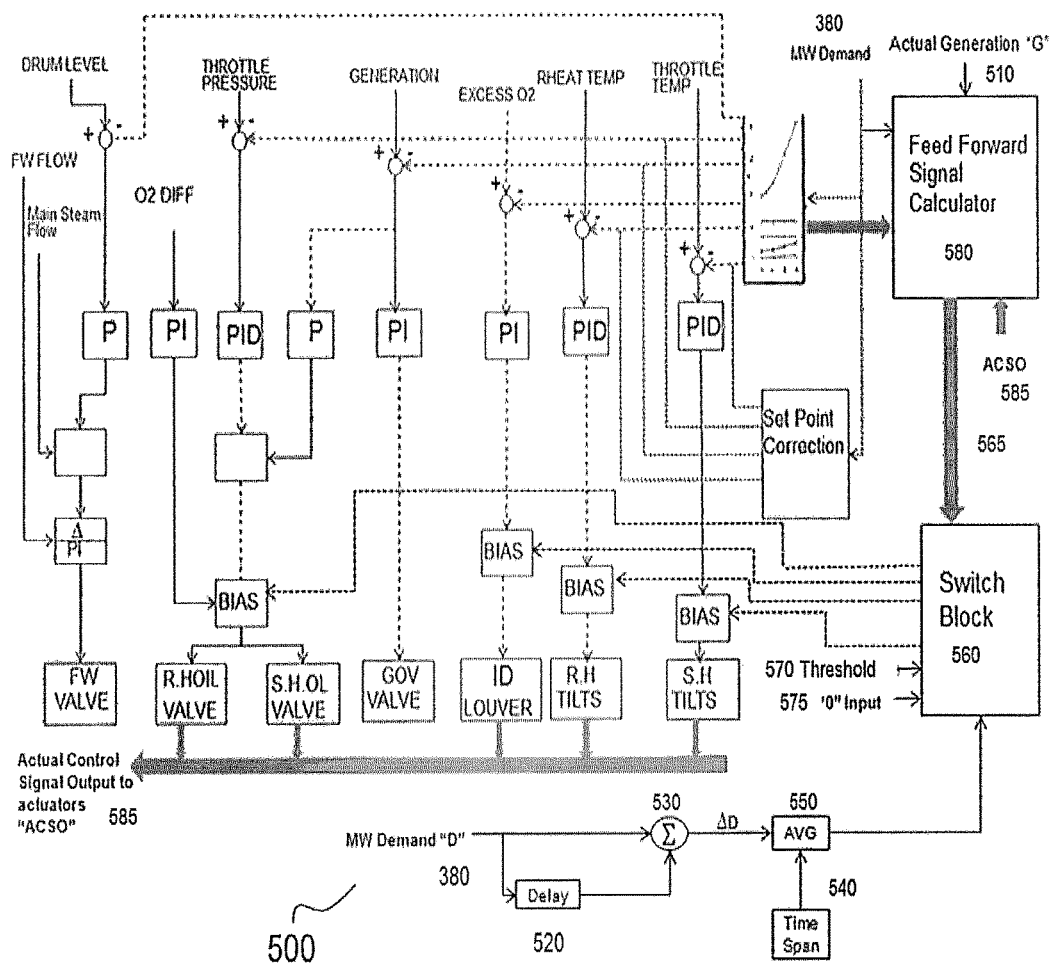
FIG. 5 is an illustration of a control system with integrated feed forward control method in accordance with an exemplary embodiment of the present disclosure.

FIG. 5 is an illustration of a control system with integrated feed forward control method in accordance with an exemplary embodiment of the present disclosure. As shown in FIG. 5, a control system 500 includes additional modules for integrating feed forward techniques. The MW set point demand "D" (380) is constantly monitored by the control system. Using a pre-determined delay block (520) and summator (530), delta "ΔD" is calculated. This ΔD is averaged over a specified time-span (illustrated with numeral 540 & 550). The output of this AVG block (550) is fed into a switch block 560. The switch block 560 includes the following feed forward input signals: a Zero feed forward control signal input; and a calculated feed forward signal input.

When the average value (absolute value) from the AVG module 550 is greater than the threshold 570 (which means the Set Point (SP) is unstable or changes rapidly) the switch selects the Zero feed forward signal (575) to the output of the critical process actuators. This is done to avoid unstable operation of the plant or transient overshoot When the average value (absolute value) from the AVG module 550 is less than the threshold value, 570 (which means the SP is stable), the calculated feed forward signal is applied to as a bias to the actuators. In this case, the difference between the present set-point and the actual generation is considered such that the feed forward signal is significant during the high difference period and decays out as the difference tends to zero.

The logic for the switch block 560 can be developed using independent fuzzy logic and integrated in the system with a feed forward signal calculator module 580. The plant data specification will also store the actual control signal (585) to actuators for various MW demands. As the set-point stabilizes and the difference between the MW demand (510) and the generation (510) is high, the switching block (560) will calculate the feed-forward signal as follows:

(i) To obtain the output specified for meeting the specified MW demand.

(ii) Check for the actual output from the loop and determine the real-time differences. This is designated as ACSO (Actual Control Signal Output to actuators), represented by numeral 585 in FIG. 5, and identifies the manipulated actuating signals.

(iii) A factor "X" is multiplied to the difference and added to the controller output from the control system which is sent to I/P (current to position) convertors to activate valves.

As the difference (Demand-Generation) reduces, the feed forward signal decays to zero or is switched to zero. The feed forward method is illustrated for a scenario where the plant MW demand is changed from 350 to 700 MW. The throttle pressure and temperature set-points can be increased and the super heater and re-heater valves can be actuated to increase the pressure and temperature. Meanwhile the feed forward calculates appropriate values and feeds the drum level actuators (feed water input valve) and also regulates the super-heater and re-heater valves. This could lead to smooth integration of the boiler and the turbine with less ramp-up time. Also, with such tightly integrated control, the steam temperature is not increased more than is called for, and hence attemperation can be limited. Hence the plant efficiency is improved and faults can be timely reported if the system does not respond as expected by the database curves (plant data specification).

Thus, a control system based on the control method using a plant data specification includes a database for storing plant data specification with periodic updates, a set point correction module tracks gaps in set points for control of the various control loops to meet a demand and update the plant data specification; and a decision module to compare the gaps in controlling the various control loops with a predefined threshold to identify fault condition in the process units associated with the various control loops including determining maintenance condition.

According to exemplary embodiments described herein, the control system can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processor(s) can be configured to include and perform features of the exemplary embodiments of the present disclosure such as, a method of controlling a plant using a plant data specification. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for controlling of a thermal power plant to provide electrical power per demand, the thermal power plant having process units and one or more actuators for regulating process parameters associated with the process units, the method comprising:
    obtaining information for at least one set point from a plant data specification that includes a list of process parameters and process outputs, wherein the plant data specification is provided by a manufacturer of the process units;
    controlling one or more control loops in the thermal power plant by providing set points for control based on the obtained information for the at least one set point to operate the thermal power plant;
    identifying gaps in controlling the one or more control loops in the thermal power plant specification and iteratively manipulating at least one set point to meet the demand;
    updating the plant data specification based on the manipulated at least one set point used to meet the demand;
    providing conditionally, feed forward signals to the one or more actuators as an additional bias, wherein the additional bias is estimated based on the updated plant data specification and a difference between the demand and actual generation values; and
    using the updated plant data specification and the feed forward signals for control of the thermal power of the plant to meet the demand.

2. The method of claim 1, wherein the plant data specification includes a list of process parameters for one or more process units.

3. The method of claim 1, wherein the plant data specification includes a list of process parameters with signal information for actuators.

4. The method of claim 1, wherein the gaps are identified for one or more control loops by determining differences with reference to the information from the plant data specification for the at least one set point.

5. The method of claim 4, wherein the determined differences for one or more control loops is compared with a threshold to identify a condition for maintenance of a process unit associated with the one or more control loops.

6. The method of claim 4, wherein the determined differences for one or more control loops is used for identifying faults in one or more control loops.

7. The method of claim1, wherein the method is used during a normal operation of the plant.

8. The method of claim 1, comprising:
    providing an additional bias to one or more actuator signals by feed forward control, wherein the additional bias is estimated based on the plant data specification.

9. A control system for a thermal power plant to provide electrical power to meet a demand, the thermal power plant comprising process units and one or more actuators for regulating process parameters associated with the process units, the control system comprising:

a database of a plant data specification providing a list of process parameters and process outputs to obtain information of at least one set point for controlling one or more control loops;

a set point correction module comprising one or more processors and memory, the set point correction module to track adjustments in the at least one set point based on the information of the at least one set point to reduce the gap to meet the demand and to update the plant data specification in the database;

a feed forward signal calculator module comprising one or more processors and memory, the feed forward signal calculator module to compute feed forward signals based on the updated plant data specification including actuator signals, demand value, and actual generation value; and a switch module comprising one or more processors and memory, the switch module to conditionally provide the feed forward signals to the corresponding one or more actuators as an additional bias based on a significance of differences in the demand value and the actual generation value, thereby controlling the thermal power plant to meet the demand.

* * * * *